United States Patent
Yu et al.

(10) Patent No.: US 10,927,970 B2
(45) Date of Patent: Feb. 23, 2021

(54) CYLINDER COMPRISING FLUID PRESSURE ADJUSTMENT VALVE HAVING IMPROVED STORAGE CAPABILITY

(71) Applicant: TEMC CO., LTD., Cheongju-si (KR)

(72) Inventors: Weon Yang Yu, Cheongju-si (KR); Sang Hoon Jeon, Cheongju-si (KR); Kyoung Min Ma, Icheon-si (KR); Dae Yong Kwon, Icheon-si (KR); Sang Youl Yi, Suwon-si (KR); Ji Won Moon, Yongin-si (KR); In Joon Chang, Gwangju-si (KR)

(73) Assignee: TEMC CO., LTD., Cheongju-si (KR)

( * ) Notice: Subject to any disclaimer, the term of this patent is extended or adjusted under 35 U.S.C. 154(b) by 0 days.

(21) Appl. No.: 16/645,631

(22) PCT Filed: Mar. 22, 2019

(86) PCT No.: PCT/KR2019/003334
§ 371 (c)(1),
(2) Date: Mar. 9, 2020

(87) PCT Pub. No.: WO2019/190123
PCT Pub. Date: Oct. 3, 2019

(65) Prior Publication Data
US 2020/0284364 A1     Sep. 10, 2020

(30) Foreign Application Priority Data

Mar. 28, 2018    (KR) ........................ 10-2018-0035855

(51) Int. Cl.
*F16K 17/06* (2006.01)
*F17C 13/04* (2006.01)

(52) U.S. Cl.
CPC .............. *F16K 17/06* (2013.01); *F17C 13/04* (2013.01); *F17C 2201/0104* (2013.01);
(Continued)

(58) Field of Classification Search
CPC ..... G05D 16/0402; F16K 17/06; F17C 13/04; F17C 2201/0104; F17C 2205/0323;
(Continued)

(56) References Cited

U.S. PATENT DOCUMENTS 5,033,499 A * 7/1991 Patel ........................ F16K 1/305
137/269
5,127,436 A * 7/1992 Campion ................ F17C 13/04
137/614.11
(Continued)

FOREIGN PATENT DOCUMENTS

EP           1585003 A1 * 10/2005 ......... G05D 16/0402
KR       20-0380316 Y1    3/2005
(Continued)

*Primary Examiner* — Jessica Cahill
(74) *Attorney, Agent, or Firm* — Novick, Kim & Lee, PLLC; Jae Yoon Kim (57) ABSTRACT

A cylinder container for storing and transporting a fluid, which is configured such that the same can store and transport a fluid, and can discharge the stored fluid at a configured discharge pressure under a configured condition. More specifically, the cylinder can have a fluid pressure adjustment valve installed on the cylinder container for storing and transporting a fluid such that a stored fluid can be discharged at a configured discharge pressure under a configured condition, the fluid pressure adjustment valve being configured such that the fluid storage capability of the cylinder container for storing and transporting a fluid can be improved.

8 Claims, 8 Drawing Sheets

(52) U.S. Cl.
CPC ............... *F17C 2205/0323* (2013.01); *F17C 2205/0338* (2013.01); *F17C 2205/0391* (2013.01); *F17C 2205/0394* (2013.01)

(58) Field of Classification Search
CPC ...... F17C 2205/0338; F17C 2205/0391; F17C 2205/0394
See application file for complete search history.

(56) References Cited

U.S. PATENT DOCUMENTS

| | | | | |
|---|---|---|---|---|
| 5,566,713 | A * | 10/1996 | Lhomer | F16K 1/305 137/613 |
| 5,937,895 | A * | 8/1999 | Le Febre | F16K 1/305 137/494 |
| 6,257,000 | B1 * | 7/2001 | Wang | F17C 9/00 62/48.1 |
| 6,314,986 | B1 * | 11/2001 | Zheng | F17C 5/02 137/240 |
| 6,343,476 | B1 * | 2/2002 | Wang | F17C 7/00 62/46.1 |
| 6,360,546 | B1 * | 3/2002 | Wang | F17C 7/02 222/3 |
| 6,901,952 | B2 * | 6/2005 | Girouard | G05D 7/0106 137/505.12 |
| 7,089,956 | B1 * | 8/2006 | Davidson | F16K 1/305 137/377 |
| 9,897,257 | B2 * | 2/2018 | Despres | F17C 13/12 |
| 2008/0017253 | A1 * | 1/2008 | Kang | G05D 16/107 137/484.2 |

FOREIGN PATENT DOCUMENTS

| | | |
|---|---|---|
| KR | 10-2006-0007917 A | 1/2006 |
| KR | 10-0792541 B1 | 1/2008 |
| KR | 10-2008-0099342 A | 11/2008 |
| KR | 10-2009-0128597 A | 12/2009 |
| KR | 10-2012-0100787 A | 9/2012 |
| KR | 10-2015-0059776 A | 6/2015 |

* cited by examiner

CYLINDER COMPRISING FLUID PRESSURE ADJUSTMENT VALVE HAVING IMPROVED STORAGE CAPABILITY

TECHNICAL FIELD

The present invention relates to a cylinder (container for storing and transporting a fluid), which can store and transport a fluid and can discharge the stored fluid at a predetermined discharge pressure under a predetermined condition.

More specifically, the present invention relates to a cylinder having a fluid pressure adjustment valve, which is installed on the cylinder (container for storing and transporting a fluid) in order to discharge a stored fluid at a predetermined discharge pressure under a predetermined condition and to improve the fluid storage capability of the cylinder (container for storing and transporting a fluid).

BACKGROUND ART

In general, a reliable supply source of process gases is required in various industrial processes and examples, and especially, gases for carrying out various processes, such as an etching process in manufacturing semiconductors. In order to supply such gases, a cylinder for storing and transporting a fluid has been widely used.

Such a cylinder for storing and transporting a fluid includes a fluid pressure adjustment valve body (fluid pressure adjustment valve system) configured to discharge the fluid at a predetermined pressure and to discharge gases just under a pressure condition of an outlet side.

Especially, Korean Patent Publication No. 10-2008-0099342 entitled 'system and method for storing and distributing fluid' and Korean Patent Publication No. 10-2015-0059776 entitled 'spike pressure prevention and management of pressure-control type container for storing and carrying a fluid' disclose the fluid pressure adjustment valve body (fluid pressure adjustment valve system).

Figure 8:
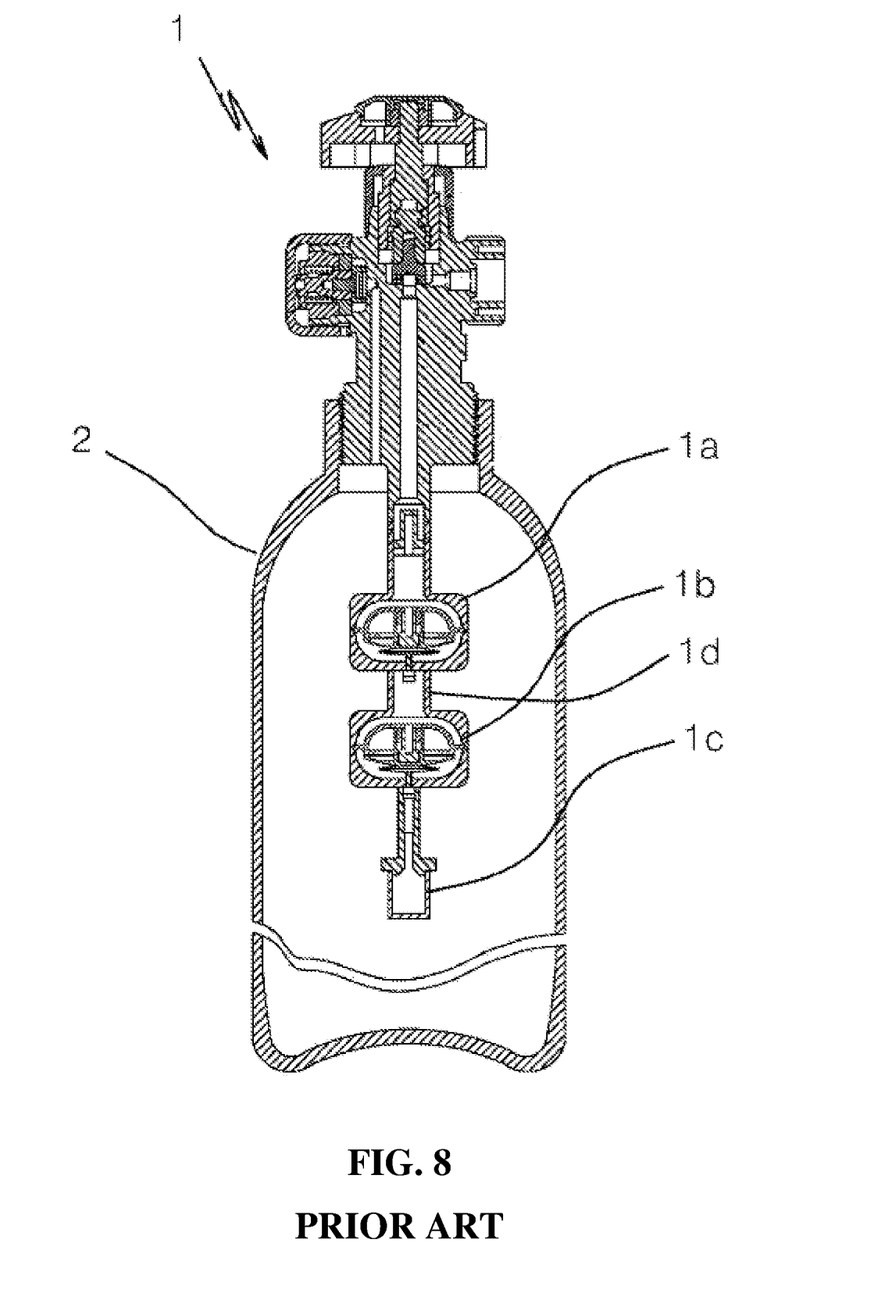
FIG. 8 is a schematically sectional view of a conventional cylinder having a fluid pressure adjustment valve body.

Referring to FIG. 8, technology related with the fluid pressure adjustment valve body disclosed in the conventional arts will be described.

The cylinder 2 for storing and transporting a fluid includes a fluid pressure adjustment valve body 1 configured to discharge the stored fluid (gas) at a predetermined pressure and to discharge the gas just under a pressure condition of an outlet side.

The fluid pressure adjustment valve body 1 configured to discharge the stored fluid (gas) at a predetermined pressure and to discharge the gas just under a pressure condition of an outlet side includes: a second regulator 1a for discharging the gas just under the pressure condition of the outlet side; and a first regulator 1b for discharging the fluid (gas) stored in the cylinder 2 at the predetermined pressure.

However, the first regulator 1b and the second regulator 1a disposed on the fluid pressure adjustment valve body 1 are accommodated in an inner space of the cylinder 2 located at a lower part to store the fluid, so that a connection pipe 1d for connecting the first regulator 1b and the second regulator 1a with each other and a particle filter 1c for filtering foreign matters are also accommodated in the inner space of the cylinder 2 for storing the fluid.

As described above, because the first regulator 1b, the second regulator 1a, the connection pipe 1d and the particle filter 1c are mounted in the inner space of the cylinder 2 for storing the fluid, a volume to store the fluid is reduced, and it may cause lots of economic losses. Especially, if the inner space of the cylinder 2 for storing the fluid is not large, because the occupation space of the first regulator 1b, the second regulator 1a, the connection pipe 1d and the particle filter 1c increases compared with the inner space, an amount of the stored and transported fluid may be reduced rapidly.

PATENT LITERATURE

Patent Documents

Patent Document 0001: Korean Patent Publication No. 10-2015-0059776

Patent Document 0002: Korean Patent Publication No. 10-2008-0099342

Patent Document 0003: Korean Patent Publication No. 10-2006-0007917

Patent Document 0004: Korean Utility Model Registration No. 20-0380316

DISCLOSURE

Technical Problem

Accordingly, the present invention has been made in an effort to solve the above-mentioned problems occurring in the prior arts.

It is an object of the present invention to provide a cylinder having a fluid pressure adjustment valve, which includes a plurality of regulators disposed in the cylinder in order to discharge a fluid stored under a predetermined condition at a predetermined discharge pressure, thereby preventing deterioration of fluid storage capability.

Another object of the present invention is to provide a cylinder having a fluid pressure adjustment valve, which is easy to repair and maintain and can reduce maintenance costs since the plurality of regulators are replaceable.

Technical Solution

To achieve the above objects, the present invention provides a cylinder for storing and transporting a fluid to discharge the stored fluid at a predetermined discharge pressure only under a predetermined pressure condition of an outlet side, the cylinder including: a first regulator capable of adjusting the discharge pressure of the fluid inside the cylinder and discharging the fluid at the adjusted pressure; a second regulator configured such that the fluid with the set pressure adjusted in the first regulator can be discharged only at the predetermined pressure condition; and a fluid pressure adjustment valve configured such that the first regulator and the second regulator are not inserted into a storage space of the cylinder to improve storage capability.

The first regulator regulates intensity of pressure of the discharged fluid, and the second regulator regulates intensity of pressure to open a flow path only under the set pressure condition of the outlet side.

A valve body of the fluid pressure adjustment valve includes a first regulator mounting room in which a first regulator is mounted and a second regulator mounting room in which a second regulator is mounted, and the first regulator mounting room and the second regulator mounting room are located outside the cylinder.

The fluid pressure adjustment valve includes: a valve body which includes a cylinder joining part having a fluid discharge inlet, a first regulator mounting room communicating with the fluid discharge inlet via a first flow path, a second regulator mounting room communicating with the first regulator mounting room via a second flow path, an opening valve mounting room communicating with the second regulator mounting room via a third flow path, a fluid discharge passage communicating with the opening valve mounting room via a fourth flow path, a safety valve mounting room communicating with the fluid discharge inlet via a fifth flow path, and a charging port room communicating with the fluid discharge inlet via a sixth flow path; a first regulator part having a first regulator mounted in the first regulator mounting room to adjust discharge pressure of the fluid in the cylinder to discharge the fluid at the predetermined pressure; a second regulator part having a second regulator mounted in the second regulator mounting room to adjust pressure to discharge the fluid under a predetermined condition of the set pressure adjusted by the first regulator; an opening valve mounted in the opening valve mounting room to block a flow of the fluid; and a safety valve mounted in the safety valve mounting room.

The first regulator and the second regulator are respectively replaceable just by separating first and second regulator caps mounted in the first and second regulator mounting rooms.

The first regulator mounting room is formed at one side of the valve body and has a first regulator screw part and a first regulator cap screw part formed on an inner wall on which the first regulator is mounted, the second regulator mounting room is formed at the other side of the valve body and has a second regulator screw part and a second regulator cap screw part formed on an inner wall on which the second regulator is mounted, the first regulator mounting room communicates with the cylinder through a first flow path, the first regulator mounting room and the second regulator mounting room are communicated with each other through a second flow path, and the second regulator mounting room communicates with an opening valve mounting room, in which an opening valve capable of blocking a flow of the fluid is mounted, through a third flow path.

The first regulator is screw-coupled with the first regulator screw part, and the first regulator cap screw part is screw-coupled with a first regulator cap to protect the first regulator.

The second regulator is screw-coupled with the second regulator screw part, and the second regulator cap screw part is screw-coupled with a second regulator cap to protect the first regulator.

Advantageous Effects

The cylinder having a fluid pressure adjustment valve with improved storage capability according to the present invention can improve storage capability of the cylinder and is easy to maintain and repair since the plurality of regulators disposed to discharge the stored fluid under the predetermined condition of the outlet side at the predetermined discharge pressure and the passage for communicating the regulators with each other are not disposed in the inner space of the cylinder storing the fluid but are disposed at one side in the valve body outside the cylinder to be formed integrally.

Furthermore, the cylinder having a fluid pressure adjustment valve with improved storage capability according to the present invention can discharge the fluid at various pressures since the first regulator disposed to discharge the fluid at uniform pressure can regulate intensity of pressure of the discharged fluid, and can rapidly deal with changes of service environment since the second regulator disposed to discharge the fluid just under the pressure condition of the outlet side can regulate intensity of pressure to open and close a flow path just under the predetermined pressure condition of the outlet side and is located outside the cylinder to easily regulate intensity of pressure.

That is, the cylinder having a fluid pressure adjustment valve with improved storage capability according to the present invention can prevent a price rise of the fluid (gas) according to transport and storage and make it easy to replace the first and second regulators and regulate pressure since the first and second regulators are located on the valve body outside the cylinder so as to effectively use the inner space of the cylinder for storing the fluid (gas).

MODE FOR INVENTION

The meaning of specific terms or words used in the specification and the claims should not be limited to the literal or commonly employed sense, but should be construed in accordance with the spirit of the invention as described herein. The description of the various embodiments is to be construed as exemplary only and does not describe every possible instance of the invention. Therefore, it should be understood that various changes may be made and equivalents may be substituted for various elements of the invention.

The present invention relates to a cylinder, which can store and transport a fluid (gas) and can discharge the stored fluid at a predetermined discharge pressure only under a predetermined condition.

That is, the cylinder according to the present invention includes: a first regulator for regulating discharge pressure of a fluid to discharge the fluid at the regulated pressure; and a second regulator for discharging the fluid of the set pressure regulated by the first regulator only under a predetermined pressure condition. The first regulator and the second regulator are accommodated in one side of a valve body, which is not inserted into the cylinder, to maximize an inner space (volume) of the cylinder for storing and transporting the fluid, so that the having a fluid pressure adjustment valve with improved storage capability can prevent a price rise according to storage and transport of the fluid and is easy to regulate pressure of the first and second regulators and to replace and repair the first and second regulators.

Now, referring to the drawings showing embodiments of the cylinder having a fluid pressure adjustment valve with improved storage capability will be described.

Figure 1:
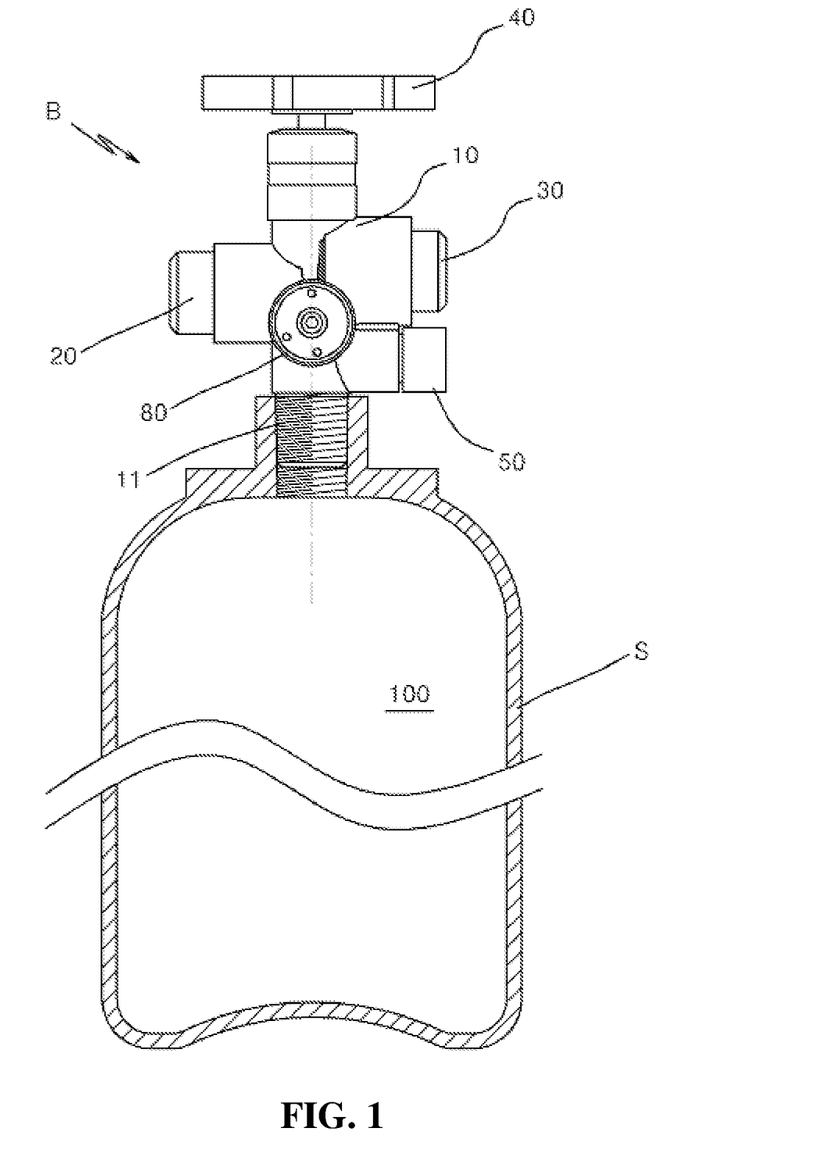
FIG. 1 is a schematic diagram of a cylinder having a fluid pressure adjustment valve with improved storage capability according to an embodiment of the present invention.

Referring to FIG. 1, the cylinder having a fluid pressure adjustment valve with improved storage capability includes: a first regulator part 20 for regulating discharge pressure of a fluid to discharge the fluid at the regulated pressure; a second regulator part 30 for discharging the fluid of the set pressure regulated by the first regulator part 20 only under a predetermined pressure condition, wherein the first regulator part 20 and the second regulator part 30 are disposed at a neck portion of the cylinder S having an inner space 100 for storing and transporting the fluid; and a fluid pressure adjustment valve B configured such that the first regulator part 20 and the second regulator part 30 are not inserted into the inner space 100 of the cylinder S.

Figure 2:
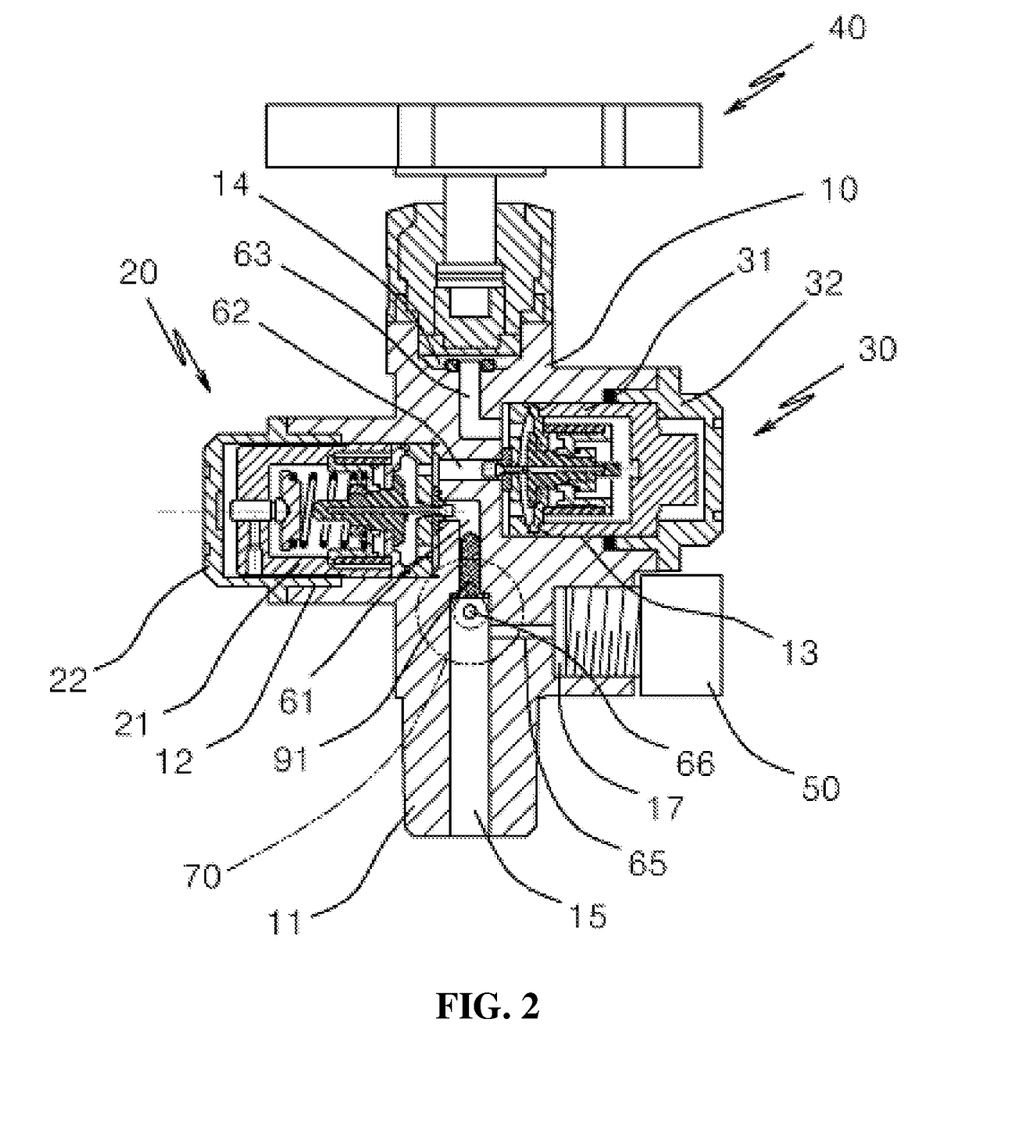
FIG. 2 is a schematically sectional view of a fluid pressure adjustment valve body of the cylinder having a fluid pressure adjustment valve with improved storage capability according to the embodiment of the present invention.
Figure 3:
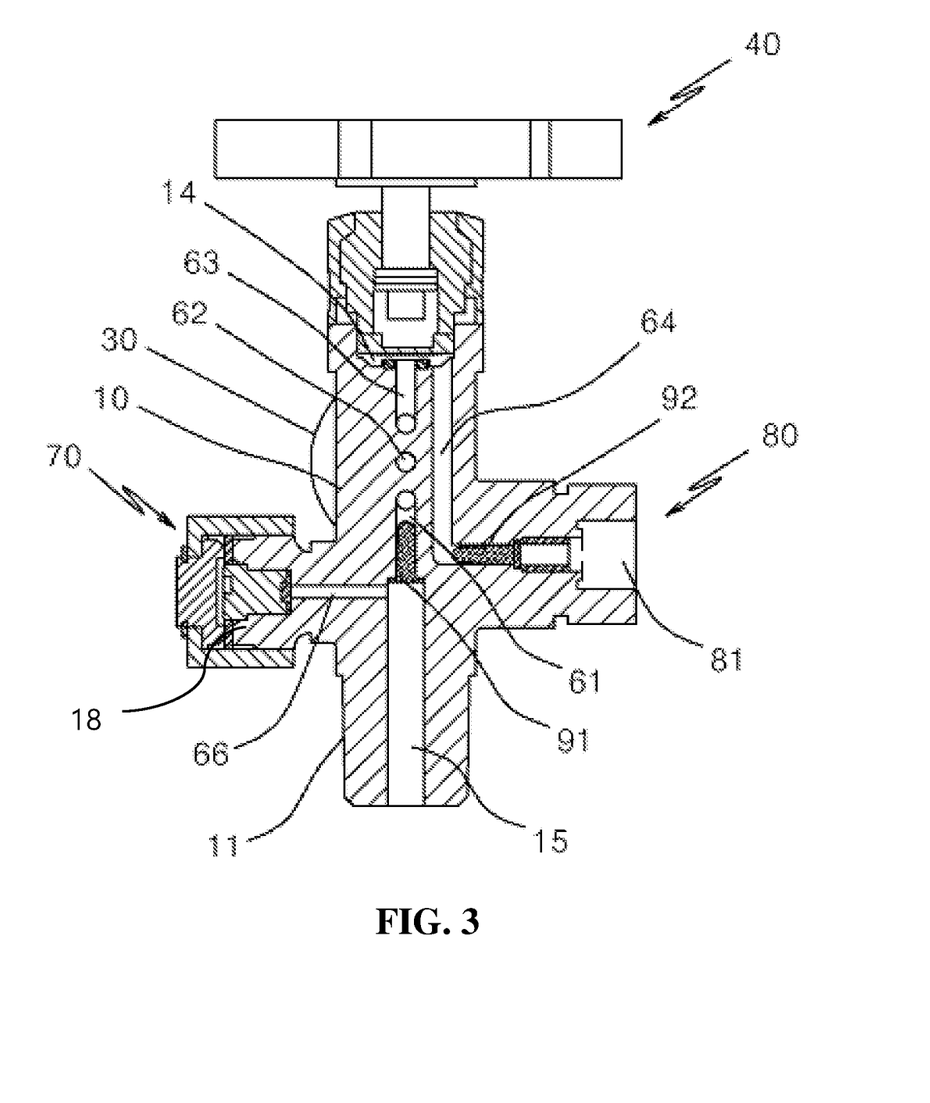
FIG. 3 is a schematically sectional view of a fluid pressure adjustment valve body of the cylinder having a fluid pressure adjustment valve with improved storage capability according to another embodiment of the present invention.

Referring to FIGS. 2 and 3, the fluid pressure adjustment valve B will be described.

The fluid pressure adjustment valve B for the cylinder includes: a valve body 10 having a cylinder joining part 11 disposed at a lower side to be mounted at an inlet (neck portion) of the cylinder S; a first regulator part 20 having a first regulator 21 accommodated in one side of the valve body 10; a second regulator part 30 having a second regulator 31 accommodated in the other side of the valve body 10; an opening valve 40 mounted at an upper side of the valve body 10 to open and close a flow path in which a fluid flows; a safety valve 50 mounted at one side of the valve body 10 for discharging the fluid when pressure of the inner space of the cylinder rises so as to make secure; a fluid charging port 70 formed at one side of the valve body 10 to be used when the inner space of the cylinder is filled with the fluid; and a fluid discharge port 80 formed at one side of the valve body 10 to be used when the fluid is discharged.

The valve body 10 includes: a cylinder joining part 11 having a fluid discharge inlet 15 formed at a lower portion to be joined to the inlet of the cylinder S; a first regulator mounting room 12 communicating with the fluid discharge inlet 15 via a first flow path 61 for guiding the fluid; a second regulator mounting room 13 communicating with the first regulator mounting room 12 via a second flow path 62 for guiding the fluid; an opening valve mounting room 14 communicating with the second regulator mounting room 13 via a third flow path 63 for guiding the fluid; a fluid discharge passage 81 communicating with the opening valve mounting room 14 via a fourth flow path 64 for guiding the fluid; a safety valve mounting room 17 communicating with the fluid discharge inlet 15 via a fifth flow path 65 for guiding the fluid; and a charging port room 18 communicating with the fluid discharge inlet 15 via a sixth flow path 66 for guiding the fluid.

The first regulator mounting room 12 accommodates the first regulator 21 mounted therein, and includes a first regulator screw part 12-1 and a first regulator cap screw part 12-2, which are formed on an inner wall thereof so that a first regulator cap 22 is mounted.

The second regulator mounting room 13 accommodates the second regulator 31 mounted therein, and includes a second regulator screw part 13-1 and a second regulator cap screw part 13-2, which are formed on an inner wall thereof so that a second regulator cap 32 is mounted.

The opening valve mounting room 14 is configured such that the opening valve 40 is mounted therein in order to prevent the fluid guided to the third flow path 63 from moving to the fourth flow path 64, and the opening valve 40 mounted in the opening valve mounting room 14 can physically block a flow of the fluid and may be one selected from various valve types, such as a manually opening valve, a pneumatically opening valve, and an electro-mechanically opening valve (solenoid valve or others).

The first flow path 61 to the sixth flow path 66 are passages to guide the fluid and are formed inside the valve body 10.

The safety valve 50 for adjusting pressure when pressure inside the cylinder rises is mounted in the safety valve mounting room 17, the fluid charging port 70 for charging a fluid is formed in the charging port room 18, and the fluid discharge port 80 is formed in the fluid discharge passage 81.

An inlet filter 91 for particles with high efficiency is mounted on the fluid discharge inlet 15 or the first flow path 61, and an outlet filter 92 for particles with high efficiency is mounted on the fluid discharge passage 81.

A charging passage for charging a fluid includes: the sixth flow path 66 configured to connect the charging port room 18 in which the fluid charging port 70 is formed with the safety valve mounting room 17 in which the safety valve 50 is mounted; and the fifth flow path 65 configured to connect the safety valve mounting room 17 with the fluid discharge inlet 15. That is, the charging passage for charging a fluid passes through the safety valve mounting room 17 in which the safety valve 50 is mounted.

Figure 4:
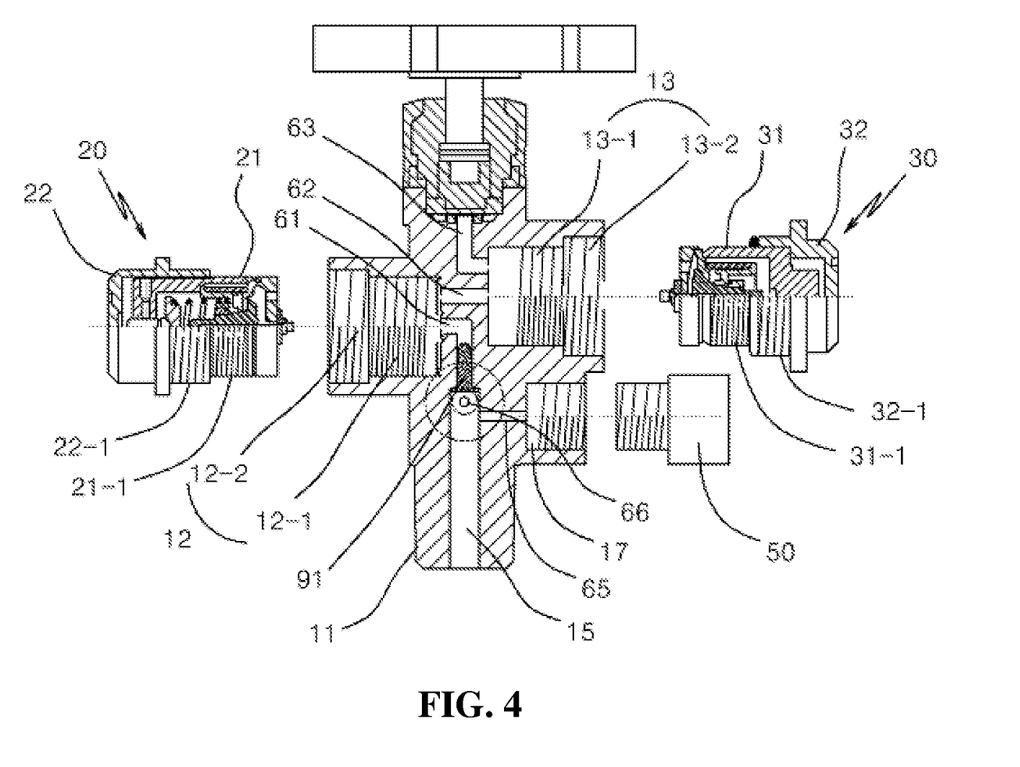
FIG. 4 is an exploded sectional view of the fluid pressure adjustment valve body of the cylinder having the fluid pressure adjustment valve with improved storage capability.
Figure 5:
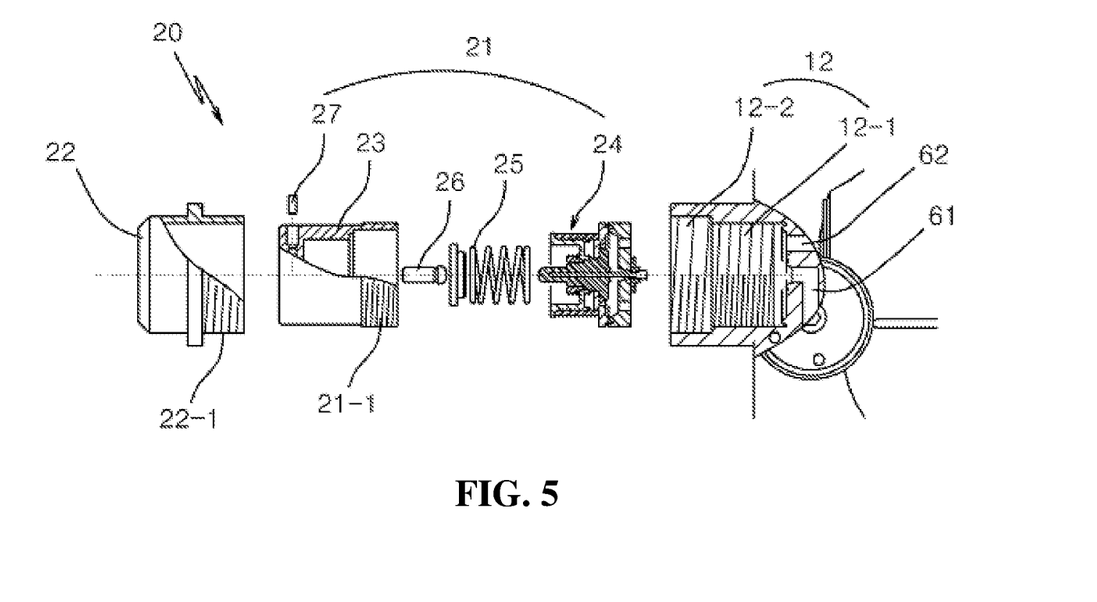
FIG. 5 is an exploded sectional view of a first regulator of the fluid pressure adjustment valve body of the cylinder having the fluid pressure adjustment valve with improved storage capability.

The first regulator part 20 includes the first regulator 21 mounted in the first regulator mounting room 12 to discharge the fluid stored in the inner space 100 of the cylinder S at the predetermined pressure so as to transfer the fluid guided to the first passage 61 to the second passage 62 at the predetermined pressure (See FIGS. 4 and 5).

Such a first regulator part 20 includes the first regulator 21 screw-coupled with the first regulator screw part 12-1 and the first regulator cap 22 screw-coupled with the first regulator cap screw part 12-2 to protect the first regulator 21.

The first regulator 21 includes: a first regulator body 23 formed in a cap shape to have an inner space and having the first regulator screw part 21-1 formed on the outer wall; a pressure adjustment body 24 having a poppet accommodated in the inner space of the first regulator body 23, a poppet maintaining wafer, and a diaphragm coupled with the poppet maintaining wafer; a pressure adjustment elastic body 25 accommodated in the inner space of the first regulator body 23 to elastically support the pressure adjustment body 24; a support pressure adjustment bar 26 for adjusting support pressure of the pressure adjustment elastic body 25; and a fastening screw 27 for fastening a location of the support pressure adjustment bar 26.

The cylinder according to the present invention can adjust pressure of the fluid guided when a user regulates elastic force of the pressure adjustment elastic body 25 using the support pressure adjustment bar 26 in order to regulate elastic support power applied to the pressure adjustment body 24.

Preferably, pressure of 5 to 20 psi acts to the pressure adjustment body 24 when the user applies load to the pressure adjustment elastic body 25 using the support pressure adjustment bar 26.

Moreover, the first regulator 21 may be separated from the first regulator mounting room 12 after the first regulator cap 22 is removed, so that the first regulator 21 can be freely replaced and freely adjust pressure.

Figure 6:
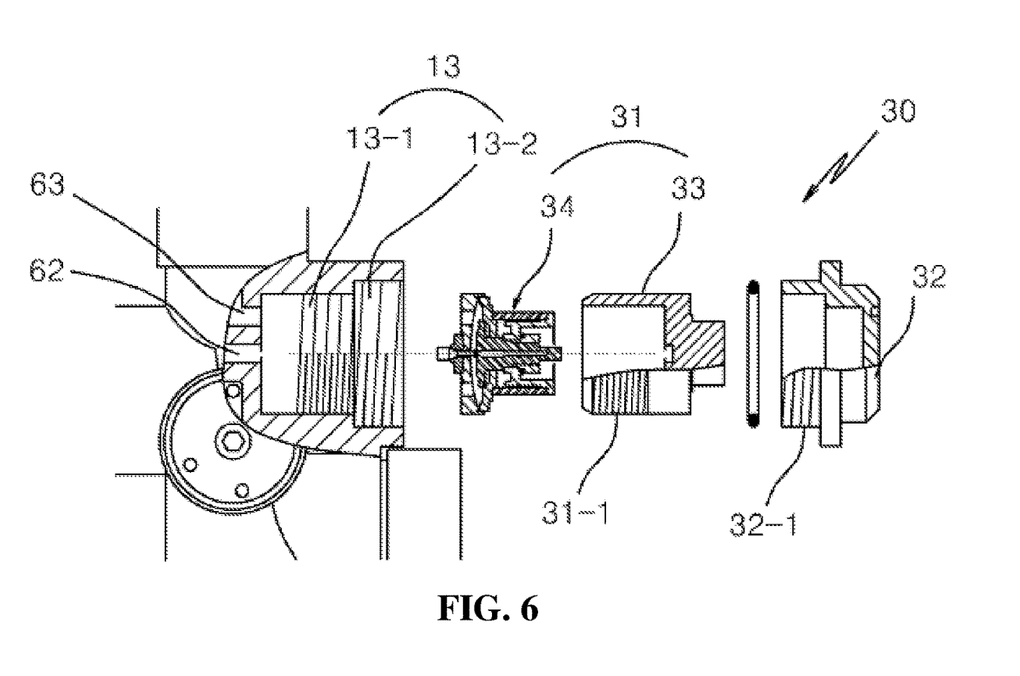
FIG. 6 is an exploded sectional view of a second regulator of the fluid pressure adjustment valve body of the cylinder having the fluid pressure adjustment valve with improved storage capability.

The second regulator part 30 includes the second regulator 31 mounted in the second regulator mounting room 13 so that the fluid guided to the second flow path 62 moves to the third flow path 63 by opening the flow path when the outlet side is at the predetermined pressure (See FIGS. 4 and 6).

The second regulator part 30 includes the second regulator 31 screw-coupled with the second regulator screw part 13-1 and the first regulator cap 32 screw-coupled with the second regulator cap screw part 13-2 to protect the second regulator 31.

The second regulator 31 includes: a second regulator body 33 formed in a cap shape to have an inner space and having the second regulator screw part 31-1 formed on the outer wall; and a pressure adjustment body 34 having a poppet accommodated in the inner space of the second regulator body 33, a poppet maintaining wafer, and a diaphragm coupled with the poppet maintaining wafer to open the fluid flow path at the predetermined pressure.

Normally, the second regulator 31 is set in such a way that the fluid passes when the fluid discharge port 80 is at vacuum pressure of 250 Torr or less.

Additionally, the second regulator 31 may be separated from the second regulator mounting room 32 after the second regulator cap 32 is removed, so that the second regulator 31 can be freely replaced and freely adjust pressure.

Figure 7:
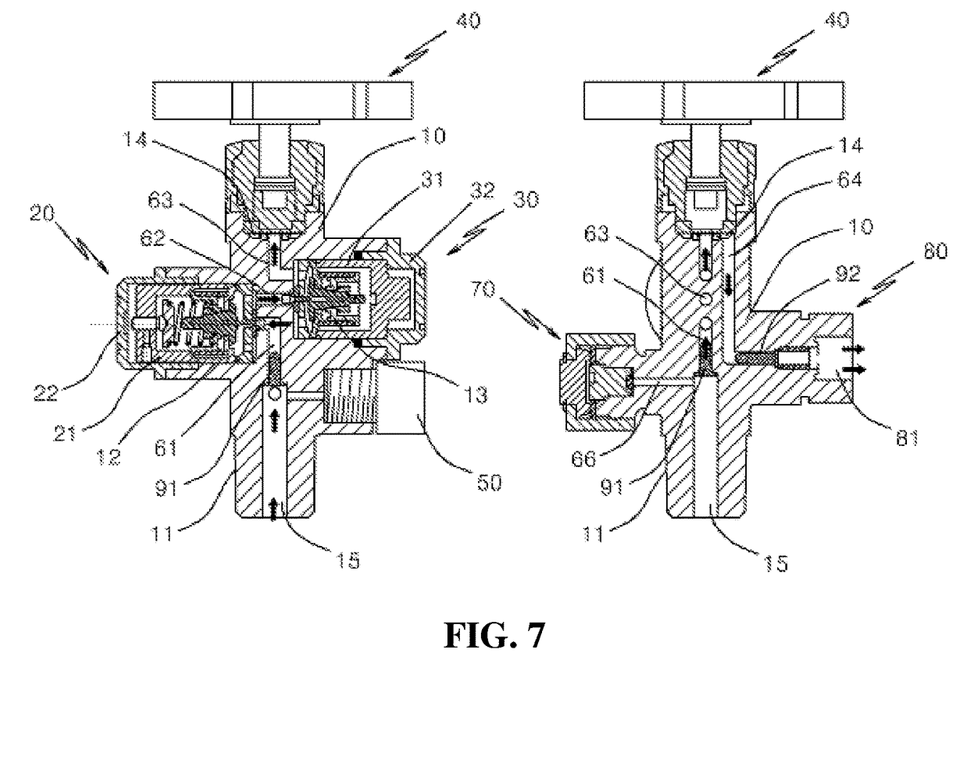
FIG. 7 is a schematically sectional view showing a flow state of a fluid (gas) of the fluid pressure adjustment valve body of the cylinder having the fluid pressure adjustment valve with improved storage capability.

FIG. 7 shows a state where the fluid stored in the inner space 100 of the cylinder S moves through the flow path guiding the fluid.

When the fluid stored in the cylinder S is guided to the first flow path 61 after passing the inlet filter 91 and flows into the first regulator mounting room 12, the fluid is guided to the second flow path 62 after being changed at the predetermined pressure by the first regulator 21.

When vacuum pressure of the fluid discharge port 80 is less than 250 Torr, the second regulator 31 guides the fluid guided to the second flow path 62 to the third flow path 63.

The fluid guided to the third flow path 63 is guided to the fourth flow path 64 through the opening valve mounting room 14, and in this instance, the flow path may be blocked by the opening valve 40 mounted in the opening valve mounting room 14.

The fluid guided to the fourth flow path 64 is discharged through the fluid discharge passage 81.

The invention claimed is:

1. A cylinder for storing and transporting a fluid to discharge the stored fluid at a predetermined discharge pressure only under a predetermined pressure condition of an outlet side, the cylinder comprising:
a first regulator capable of adjusting the discharge pressure of the fluid inside the cylinder and discharging the fluid at the adjusted pressure; a second regulator configured such that the fluid with the set pressure adjusted in the first regulator can be discharged only at the predetermined pressure condition; and a fluid pressure adjustment valve configured such that the first regulator and the second regulator are not inserted into a storage space of the cylinder to improve storage capability,
wherein the fluid pressure adjustment valve comprises: a valve body which includes a cylinder joining part having a fluid discharge inlet, a first regulator mounting room communicating with the fluid discharge inlet via a first flow path, a second regulator mounting room communicating with the first regulator mounting room via a second flow path, an opening valve mounting room communicating with the second regulator mounting room via a third flow path, a fluid discharge passage communicating with the opening valve mounting room via a fourth flow path, a safety valve mounting room communicating with the fluid discharge inlet via a fifth flow path, and a charging port room communicating with the fluid discharge inlet via a sixth flow path; a first regulator part having a first regulator mounted in the first regulator mounting room to adjust discharge pressure of the fluid in the cylinder to discharge the fluid at the predetermined pressure; a second regulator part having a second regulator mounted in the second regulator mounting room to adjust pressure to discharge the fluid under a predetermined condition of the set pressure adjusted by the first regulator; an opening valve mounted in the opening valve mounting room to block a flow of the fluid; and a safety valve mounted in the safety valve mounting room.

2. The cylinder according to claim 1, wherein the first regulator regulates intensity of pressure of the discharged fluid, and the second regulator regulates intensity of pressure to open a flow path only under the set pressure condition of the outlet side.

3. The cylinder according to claim 2, wherein the first regulator mounting room and the second regulator mounting room of the fluid pressure adjustment valve are located outside the cylinder.

4. The cylinder according to claim 1, wherein the first regulator mounting room and the second regulator mounting room of the fluid pressure adjustment valve are located outside the cylinder (S).

5. The cylinder according to claim 4, wherein the first regulator and the second regulator are respectively replaceable just by separating first and second regulator caps mounted in the first and second regulator mounting rooms.

6. A cylinder for storing and transporting a fluid to discharge the stored fluid at a predetermined discharge pressure only under a predetermined pressure condition of an outlet side, the cylinder comprising:
a first regulator capable of adjusting the discharge pressure of the fluid inside the cylinder and discharging the fluid at the adjusted pressure; a second regulator configured such that the fluid with the set pressure adjusted in the first regulator 21 can be discharged only at the predetermined pressure condition; and a fluid pressure adjustment valve configured such that the first regulator and the second regulator are not inserted into a storage space of the cylinder to improve storage capability,
wherein the fluid pressure adjustment valve comprises a valve body, the valve body includes a first regulator mounting room in which a first regulator is mounted and a second regulator mounting room in which a second regulator is mounted, and the first regulator mounting room and the second regulator mounting room are located outside the cylinder,
wherein the first regulator mounting room is formed at one side of the valve body and has a first regulator screw part and a first regulator cap screw part formed on an inner wall on which the first regulator is mounted, the second regulator mounting room is formed at the other side of the valve body and has a second regulator screw part and a second regulator cap screw part formed on an inner wall on which the second regulator is mounted, the first regulator mounting room communicates with the cylinder through a first flow path, the first regulator mounting room and the second regulator mounting room are communicated with each other through a second flow path, and the second regulator mounting room communicates with an opening valve mounting room, in which an opening valve capable of blocking a flow of the fluid is mounted, through a third flow path, wherein the first regulator is screw-coupled with the first regulator screw part, and the first regulator cap screw part is screw-coupled with a first regulator cap to protect the first regulator, and wherein the second regulator is screw-coupled with the second regulator screw part, and the second regulator cap screw part is screw-coupled with a second regulator cap to protect the first regulator.

7. The cylinder according to claim 6, wherein the first regulator comprises:
   a first regulator body formed in a cap shape to have an inner space and having a first regulator screw part formed on the outer wall;
   a pressure adjustment body having a poppet accommodated in the inner space of the first regulator body, a poppet maintaining wafer, and a diaphragm coupled with the poppet maintaining wafer;
   a pressure adjustment elastic body accommodated in the inner space of the first regulator body to elastically support the pressure adjustment body;
   a support pressure adjustment bar for adjusting support pressure of the pressure adjustment elastic body; and
   a fastening screw for fastening a location of the support pressure adjustment bar.

8. The cylinder according to claim 6, wherein the second regulator comprises:
   a second regulator body formed in a cap shape to have an inner space and having a second regulator screw part formed on the outer wall; and
   a pressure adjustment body having a poppet accommodated in the inner space of the second regulator body, a poppet maintaining wafer, and a diaphragm coupled with the poppet maintaining wafer to open the fluid flow path at the predetermined pressure.

\* \* \* \* \*